(12) United States Patent
Foster et al.

(10) Patent No.: US 6,485,077 B1
(45) Date of Patent: Nov. 26, 2002

(54) VEHICLE STORAGE COMPARTMENT

(75) Inventors: Steven Foster, Rochester Hills, MI (US); Roch Tolinski, Howell, MI (US); Holly Giangrande, Troy, MI (US); Charlie Hopson, Lebanon, TN (US); Nicholas Kalargeros, Coventry (GB); Carmelo Mondello, Frankfurt (DE); Rainer Grimm, Frankfurt (DE); Laurent Arquevaux, Sully sur Loire (FR)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/548,139

(22) Filed: Apr. 13, 2000

(51) Int. Cl.[7] .................................................. B62D 43/00
(52) U.S. Cl. ...................... 296/37.1; 296/37.6; 296/183
(58) Field of Search ................................ 296/37.1, 37.6, 296/57.1, 183

(56) References Cited

U.S. PATENT DOCUMENTS

| | | | | |
|---|---|---|---|---|
| 2,955,858 A | * | 10/1960 | Trammell, Jr. .................. 292/1 |
| 3,068,038 A | * | 12/1962 | Douglass, Jr. ............... 296/37.6 |
| 4,125,281 A | * | 11/1978 | Dean et al. .................... 292/148 |
| 4,416,126 A | * | 11/1983 | Remington .................... 70/312 |
| 4,458,930 A | * | 7/1984 | Goike et al. ................. 292/201 |
| 4,505,500 A | * | 3/1985 | Utsumi et al. ................. 292/48 |
| 4,684,178 A | * | 8/1987 | Craig ........................... 312/221 |
| 4,897,643 A | * | 1/1990 | Shibata et al. ............. 340/5.61 |
| 4,951,486 A | * | 8/1990 | Braun et al. .................. 70/208 |
| 5,388,435 A | * | 2/1995 | Bailey ......................... 292/100 |
| 5,481,889 A | * | 1/1996 | Richard et al. ................ 70/118 |
| 5,485,922 A | * | 1/1996 | Butcher ....................... 206/576 |
| 5,595,076 A | * | 1/1997 | Weinerman et al. .......... 70/208 |
| 5,615,922 A | * | 4/1997 | Blanchard ................... 296/37.6 |
| 5,676,409 A | * | 10/1997 | Trammell, Jr. ........... 292/336.3 |
| 5,715,712 A | * | 2/1998 | West .......................... 292/144 |
| 5,784,769 A | * | 7/1998 | Clare .......................... 296/37.6 |
| 5,810,434 A | * | 9/1998 | Thompson et al. .......... 297/117 |
| 5,823,598 A | * | 10/1998 | Clare et al. ................. 296/37.6 |
| 5,979,617 A | * | 11/1999 | Clare et al. ............. 296/37.6 X |
| 6,099,052 A | * | 8/2000 | Spitzley ..................... 292/336.3 |
| 6,102,474 A | * | 8/2000 | Daley .................... 296/37.6 X |
| 6,155,625 A | * | 12/2000 | Felix ...................... 296/37.1 X |
| 6,237,211 B1 | * | 5/2001 | Clare et al. ............ 296/37.6 X |
| 6,263,867 B1 | * | 7/2001 | Skelton ..................... 126/25 R |

* cited by examiner

*Primary Examiner*—D. Glenn Dayoan
*Assistant Examiner*—Lori L Coletta
(74) *Attorney, Agent, or Firm*—Carlson, Gaskey & Olds

(57) ABSTRACT

A vehicle fender includes an integrally formed storage compartment for storing items such as tools and equipment. The fender has fender body mounted to a vehicle frame, chassis, or unibody member. In one embodiment, a recess is formed within the fender body for storing items. A panel is pivotally attached to the fender body and pivots between an open position to allow access to the tools and a closed position to store the tools. A length, a width, and a height define the recess. In the preferred embodiment, the length is greater than the width and the height such that long items can be easily stored. In another embodiment, the panel is formed as a fender panel and a support is formed between the fender body and the fender panel. The fender panel is pivoted to the open position to allow access to the support.

21 Claims, 4 Drawing Sheets

VEHICLE STORAGE COMPARTMENT

BACKGROUND OF THE INVENTION

This invention relates to compartment formed within a vehicle fender for storing items.

Pick-up trucks typically have an open rear truck bed for transporting large items. While some truck beds are enclosed with a cap or snap-on cover, many truck beds are left open so that larger items such as furniture, landscaping equipment, ladders, or other tools and accessories can be easily transported. Open truck-beds usually do not provide safekeeping of items such as tools or other equipment that a truck owner wants to store in the truck on a regular basis.

Sometimes, a bed-liner with a storage lock box is mounted within the truck bed to store tools and other accessories in the truck for an extended period of time. One disadvantage with the lock boxes is that they take-up valuable payload space, i.e. the amount of cargo space is decreased. Additionally, such boxes typically extend laterally across the truck bed, i.e., items stored within the boxes must be shorter in length than the width of the truck bed. This means that longer items such as shovels, rakes, etc. cannot be stored for safekeeping.

Another disadvantage with these storage lock boxes is that they are typically positioned across the back of the truck bed near the passenger compartment. This means that access to the boxes is awkward and cumbersome, requiring the vehicle operator to climb into the truck bed to remove items from the box.

Thus, it is desirable to have a compartment formed in part of the vehicle other than the truck bed, which can store items without decreasing cargo space in the truck bed. Such a compartment should also be easily accessible and capable of storing items extended length.

SUMMARY OF THE INVENTION

In a disclosed embodiment of this invention, a vehicle fender includes a storage compartment for storing tools and equipment. The fender is comprised of a fender body that is mounted to a vehicle structure. A recess is formed within the fender body for storing at least one item. A panel is pivotally attached to the fender body to pivot between an open position to allow access to the recess and a closed position to prevent access to the recess.

In one embodiment, the recess is defined by a bottom portion, a back portion, a top portion, and a pair of side portions that are integrally formed within the fender body as one piece. Thus, the fender has an integrally formed storage compartment with a pivoting panel that can be closed to protect items from the external environment. Preferably, the recess is defined by a length, a width, and a height with the length being greater than the width and the height, such that long items can be stored.

In a preferred embodiment, the vehicle fender includes a fender body mounted to a vehicle structure and a fender panel pivotally attached to the fender body to pivot between an open position and a closed position. At least one support, such as a shelf, for example, is formed between the fender body and the fender panel for supporting at least one item. The support is inaccessible when the fender panel is in the closed position and accessible when the fender panel is in the open position.

These and other features of the present invention can be best understood from the following specification and drawings, the following of which is a brief description.

DETAILED DESCRIPTION OF A PREFERRED EMBODIMENT

Figure 1:
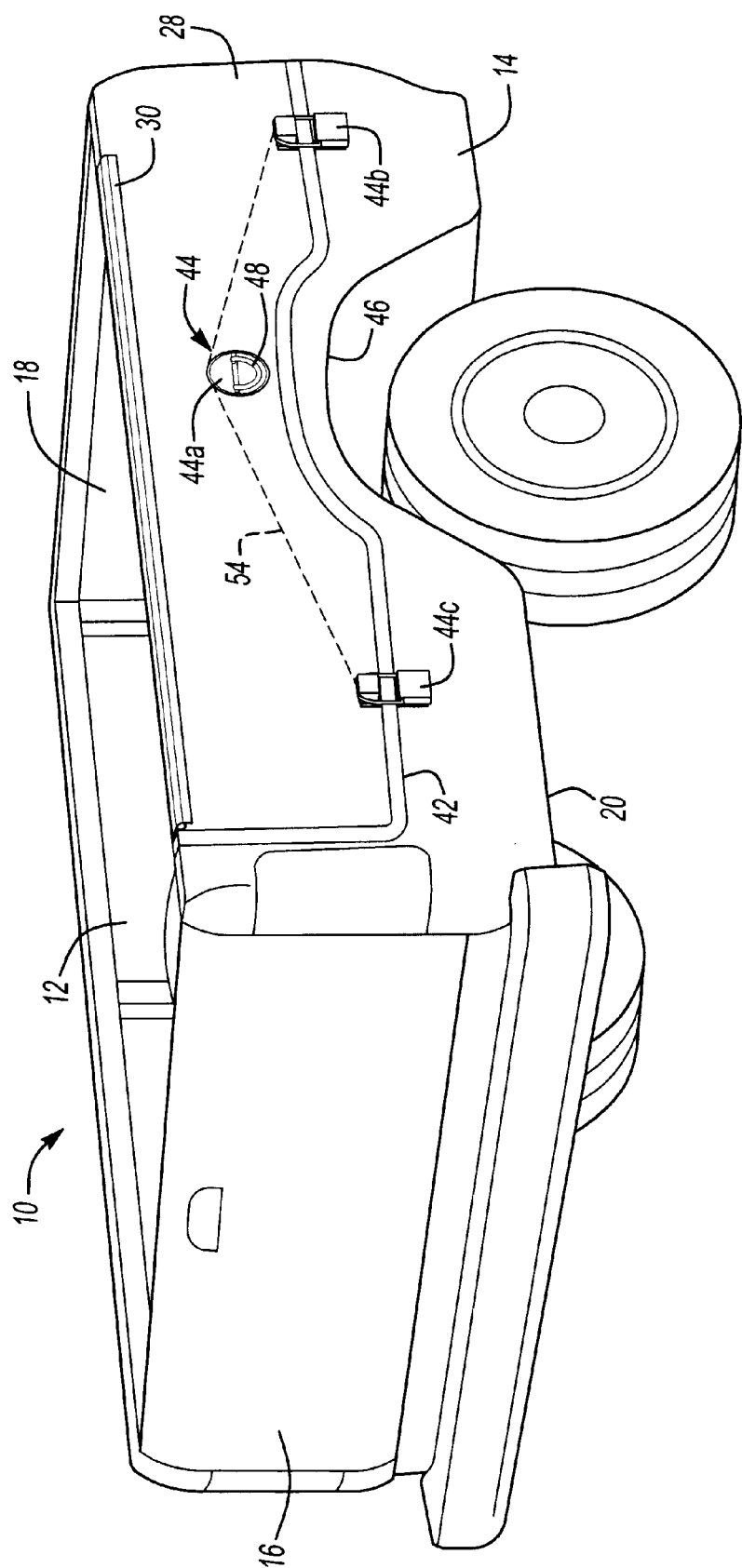
FIG. 1 is a perspective view of one embodiment of the subject storage compartment in the closed position.

A vehicle body is generally shown at 10 in FIG. 1. The vehicle is preferably a pick-up truck or sport utility vehicle, however the invention can be easily incorporated into other types of vehicles. The vehicle body 10 includes a pick-up truck bed having a driver side fender 12, a passenger side fender 14, a tailgate 16, and a front connecting member 18. The tailgate 16 and front connecting member 18 connect opposing ends of the driver 12 and passenger 14 side fenders to form a box. The box attached to a bottom support member 20 to form a truck bed. The truck bed is mounted to a vehicle frame, chassis, or unibody member. It should be understood that the box can be made from a single piece of material that is folded together, can be made from individual pieces that are attached together, or a combination thereof.

Figure 2:
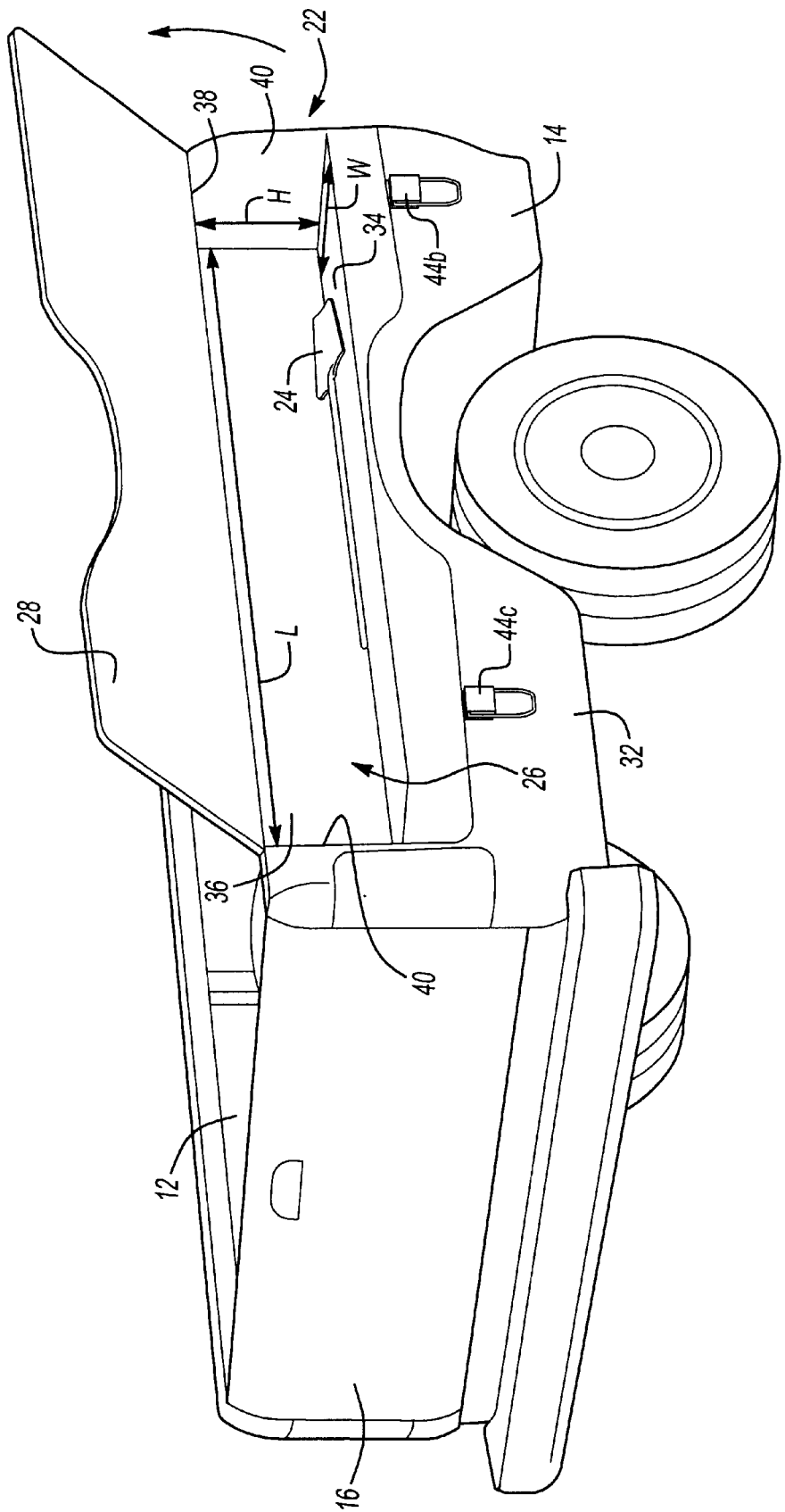
FIG. 2 is a perspective view of the embodiment of FIG. 1 in the open position.

A storage compartment, shown generally at 22 in FIG. 2, is formed behind either the driver 12 or passenger 14 side fenders for storing tools 24 or other accessories. In one embodiment, a recess 26 is formed within the driver 12 or passenger 14 side fender body for storing various items. A panel 28 is pivotally attached to the fender body 14 to pivot between an open position to allow access to the recess 26 (FIG. 2) and a closed position to prevent access to the recess 26 (FIG. 1). The panel 28 is preferably attached via a live hinge connection 30, however other connections such as a piano hinge or door hinge could also be used. Tools 24 or other items are stored within the recess 26 and are protected from the external environment when the panel 28 is in the closed position.

The fender body 14 is formed having a substantially planar exterior surface portion 32. The recess 26 is defined by a bottom portion 34, a back portion 36, a top portion 38, and a pair of side portions 40 integrally formed within the fender body 14 as one piece. When the panel 28 is in the open position, the recess 26 presents an opening that is generally coplanar with the exterior surface portion 32 of the fender body 14. A length L, a width W, and a height H define the recess 26 where the length L of the recess 26 extends longitudinally along the fender 14. In the preferred embodiment, the length L is greater than the width W and the height H such that long items such as shovels, rakes, etc. can be stored.

As discussed above, the panel 28 is supported on the fender 14 along the top portion with a hinge connection 30. The panel 28 covers the recess opening to enclose the recess 26 when the panel 28 is pivoted to the closed position. Preferably, trim 42 surrounds and seals the panel 28 to protect the items stored inside.

The bottom portion 34 of the recess 26 has a bottom surface that extends in a direction transverse to the planar exterior surface 32 for supporting tools 24 or other items. The bottom portion 34 thus serves as a shelf that is formed between the fender body 14 and the panel 28.

A locking mechanism, shown generally at 44, is used to selectively lock the fender panel 28 with respect to the fender body 14. The locking mechanism 44 can be any type of locking mechanism known in the art and is preferably centrally located along the fender panel 28. In one embodiment, the locking mechanism 44 is located within the wheel well 46 of the vehicle.

The locking mechanism 44 preferably includes a center lock 44a, a forward lock 44b, and a rearward lock 44c. The center lock 44*a* serves as the main locking device and is interconnected to the forward 44*b* and rearward 44*c* locks by a linkage assembly 54 as is known in the art. An actuator 48 supported on the panel 28 is used to selectively unlock the center lock 44*a*, which in turn unlocks the forward 44*b* and rearward 44*c* locks via the linkage assembly 54. Or, optionally, the center lock 44*a* can be the sole lock and snap-attachments, located on forward and rearward portions of the panel, can be individually unsnapped after the center lock 44*a* is unlocked.

Figure 3:
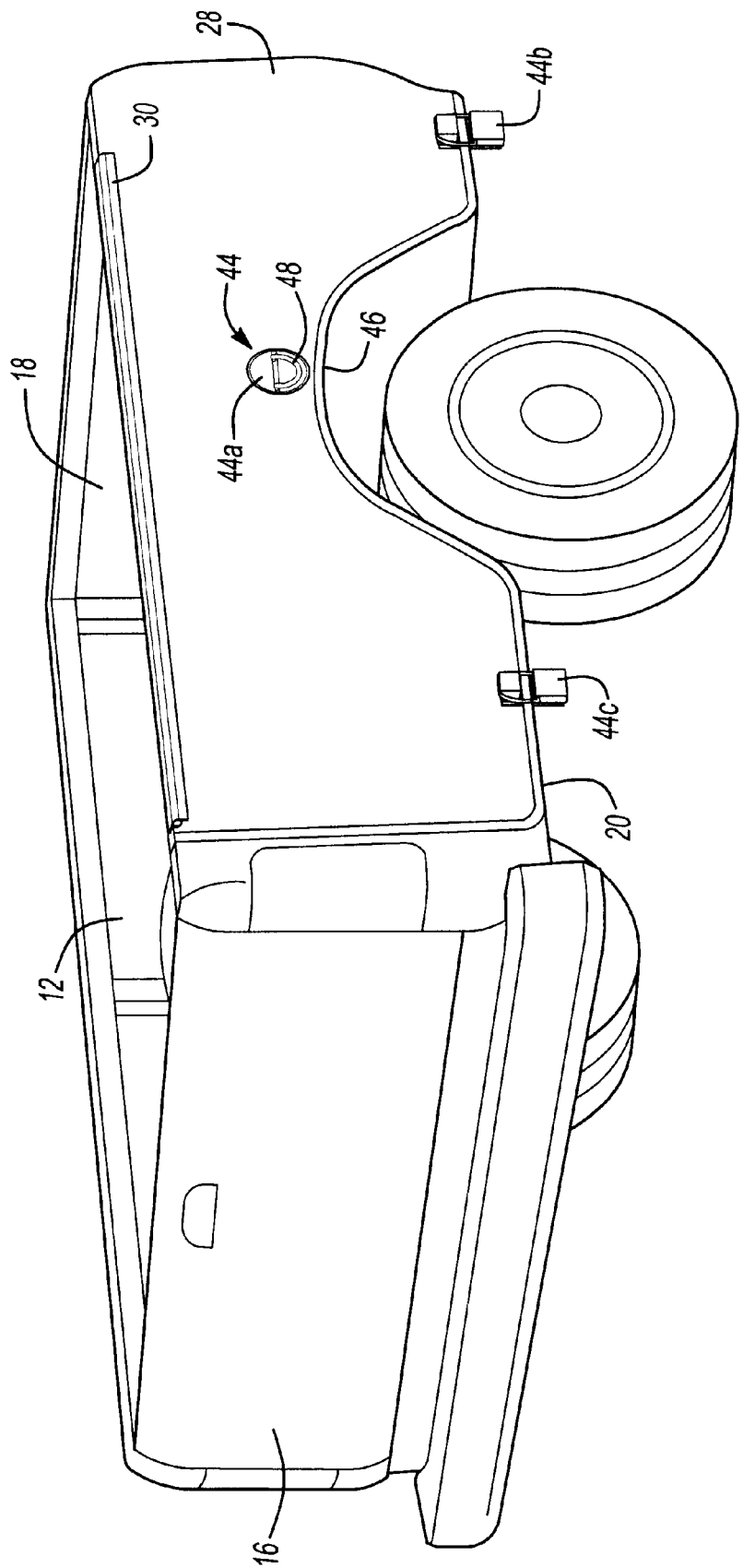
FIG. 3 is a perspective view of a second embodiment of the subject storage compartment in the closed position.
Figure 4:
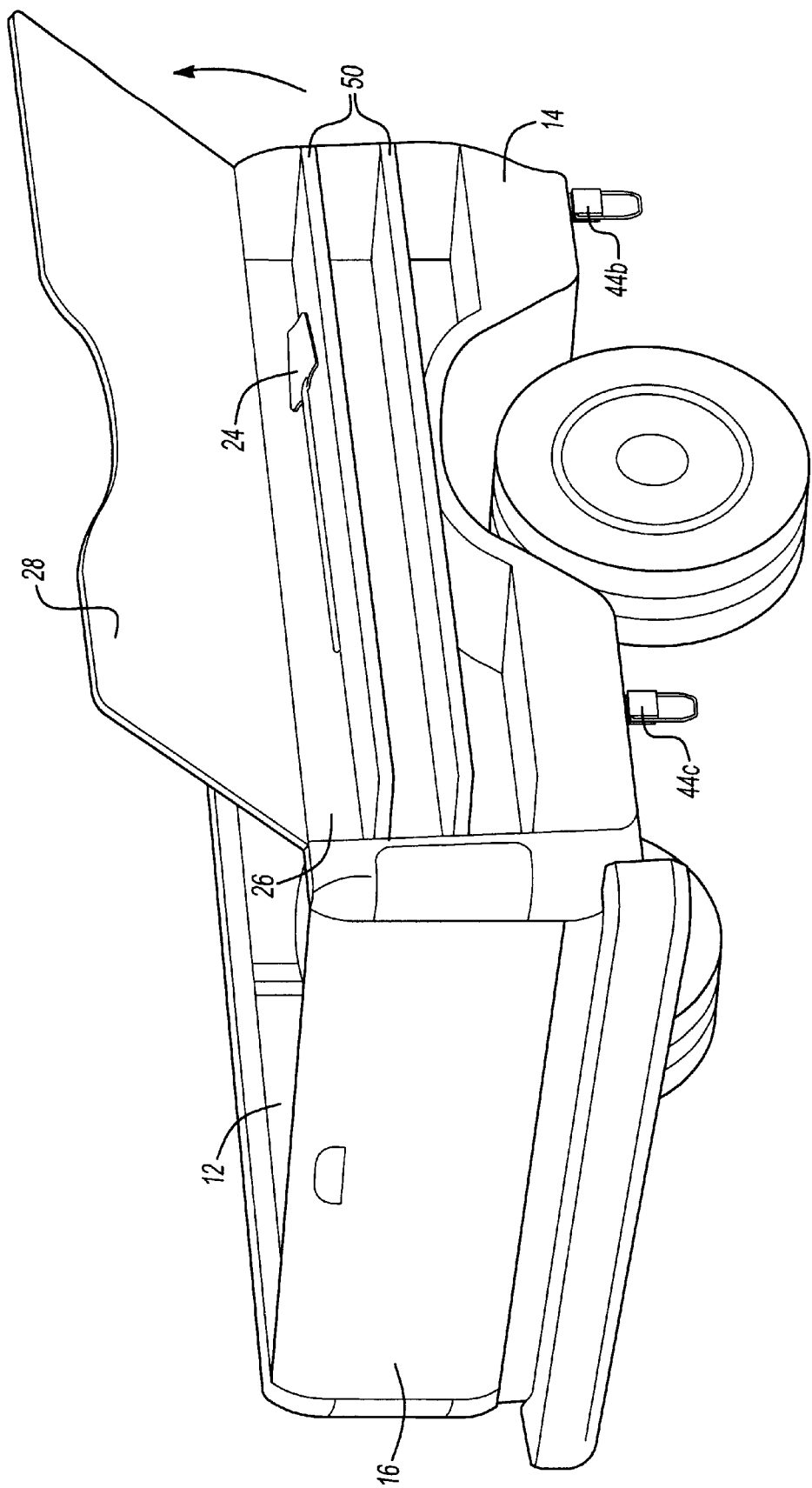
FIG. 4 is a perspective view of the embodiment of FIG. 3 in the open position.

In an alternate embodiment shown in FIGS. 3 and 4, the entire external driver and/or passenger side fender is pivoted to reveal a storage compartment recess 26. At least one support member 50, such as a shelf or rack, is formed between the fender body 14 and the fender panel 28 for supporting items 24. Optionally, a plurality of shelves or racks 50 of varying length can be formed between the fender body 14 and fender panel 28. The shelves 50 are inaccessible when the fender panel 28 is in the closed position and accessible when the fender panel 28 is in the open position. A locking mechanism 44, as discussed above, is used to selectively lock the fender panel 28 with respect to the fender body 14.

The unique vehicle fender allows storage compartments to be easily formed within the vehicle. Items can be securely stored in these compartments and protected from external contaminants.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A vehicle fender comprising:
    a fender body mounted to a vehicle structure;
    a recess formed within said fender body for storing at least one item;
    a panel pivotally attached to said fender body to pivot between an open position to allow access to said recess and a closed position to prevent access to said recess; and
    an actuator supported on said panel for selectively unlocking a lock on said panel.

2. A fender as recited in claim 1 wherein said fender body includes a substantially planar exterior surface portion.

3. A fender as recited in claim 2 wherein said recess is defined by a bottom portion, a back portion, a top portion, and a pair of side portions integrally formed within said fender body as one piece.

4. A fender as recited in claim 3 wherein said recess presents an opening that is generally coplanar with said exterior surface portion of said fender body.

5. A fender as recited in claim 4 wherein said panel is supported on said fender along said top portion, said panel covering said opening to enclose said recess when said panel is pivoted to said closed position.

6. A fender as recited in claim 2 wherein said recess has a bottom surface extending in a direction transverse to said planar exterior surface for supporting said item.

7. A fender as recited in claim 1 wherein a hinge pivotally attaches said panel to said fender body.

8. A fender as recited in claim 1 wherein said recess is defined by a length, a width, and a height, said length being greater than said width and said height.

9. A vehicle body comprising:
    a first fender;
    a second fender spaced apart from said first fender;
    a rear body portion interconnecting said first and second fenders at one end;
    a front body portion interconnecting said first and second fenders at an opposite end;
    a substantially planar bottom portion attached to said first fender, said second fender, said rear body portion, and said front body portion to form a bed;
    a recess formed in one of said fenders for storing at least one item;
    a panel pivotally attached to said fender body adjacent to said recess to pivot between an open position to allow access to said recess and a closed position to prevent access to said recess; and
    an actuator supported on said panel for selectively unlocking a lock on said panel.

10. A vehicle body as recited in claim 9 wherein said recess has a support surface generally parallel to said bottom portion.

11. A vehicle body as recited in claim 10 wherein said recess is defined by a length, a width, and a height, said length being greater than said width and said height.

12. A vehicle body as recited in claim 11 wherein said length of said recess extends longitudinally along said fender.

13. A vehicle body as recited in claim 12 wherein said recess is defined by a bottom, a back, a top, and a pair of sides integrally formed within said fender as one piece.

14. A vehicle fender comprising:
    a fender body mounted to a vehicle structure;
    a fender panel pivotally attached to said fender body to pivot between an open position to allow access to said recess and a closed position;
    at least one support formed between said fender body and said fender panel for supporting at least one item wherein said support is inaccessible when said fender panel is in said closed position and accessible when said fender panel is in said open position; and
    an actuator supported on said panel for selectively unlocking a lock on said panel.

15. A fender as recited in claim 14 including a locking mechanism for selectively locking said fender panel with respect to said fender body.

16. A fender as recited in claim 15 wherein said locking mechanism is centrally located along said fender panel.

17. A fender as recited in claim 16 wherein said locking mechanism is comprised of a center lock, a forward lock, a rearward lock, said center lock being interconnected to said forward and rearward locks by a linkage assembly.

18. A fender as recited in claim 17 wherein said actuator selectively unlocks said center lock and said linkage assembly unlocks said forward and rearward locks when said center lock is unlocked.

19. The vehicle fender as recited in claim 1 wherein said panel is formed with said fender body as one piece with a living hinge defining pivotal attachment of said panel to said fender body.

20. The vehicle body as recited in claim 9 wherein said panel is formed with said fender body as one piece with a living hinge defining pivotal attachment of said panel to said fender body.

21. The vehicle fender as recited in claim 14 wherein said panel is formed with said fender body as one piece with a living hinge defining pivotal attachment of said panel to said fender body.

* * * * *